United States Patent
Bens

[19]

[11] Patent Number: 6,000,364
[45] Date of Patent: Dec. 14, 1999

[54] TRAINING INSTALLATION FOR HORSES

[76] Inventor: Petrus Ardina Gerardus Bens, Vorstengraflaan 1A, NL-5342 LM, Oss, Netherlands

[21] Appl. No.: 08/956,126
[22] Filed: Oct. 22, 1997

[30]  Foreign Application Priority Data

Oct. 22, 1996 [NL] Netherlands ............................ 1004334

[51] Int. Cl.⁶ ...................................................... A01K 3/00
[52] U.S. Cl. ............................................................ 119/510
[58] Field of Search .................................... 119/423, 510, 119/703, 704, 780

[56]  References Cited

U.S. PATENT DOCUMENTS

| | | | |
|---|---|---|---|
| 3,312,195 | 4/1967 | Rohena | 119/704 |
| 3,349,751 | 10/1967 | Frostad | 119/703 |
| 3,908,599 | 9/1975 | Flocchini | 119/510 |
| 4,006,714 | 2/1977 | Goossen | 119/510 |
| 4,313,397 | 2/1982 | Markum | 119/703 |
| 5,630,380 | 5/1997 | Karanges | 119/704 |

FOREIGN PATENT DOCUMENTS 404 711  12/1990  European Pat. Off. .

*Primary Examiner*—Robert P. Swiatek
*Assistant Examiner*—Elizabeth Shaw
*Attorney, Agent, or Firm*—Sughrue, Mion, Zinn, Macpeak & Seas, PLLC

[57]  ABSTRACT

A training installation for allowing horses to trot around an enclosed course with side walls. A driving element, which is rotatable around the course, is formed by a number of flexible rod elements, a first end of which is attached to an arm and a second end of which hangs free above the course. A driving device is formed by the rod elements, it being possible for individual rod elements to be simply replaced and a high measure of safety for the horses being obtained as a result of the flexible characteristics of the rod elements. Preferably, the outer surface of each rod element is electrically conductive, such as, by, an aluminium foil being wound around. The rod elements themselves can be formed by a plastic tube.

11 Claims, 3 Drawing Sheets

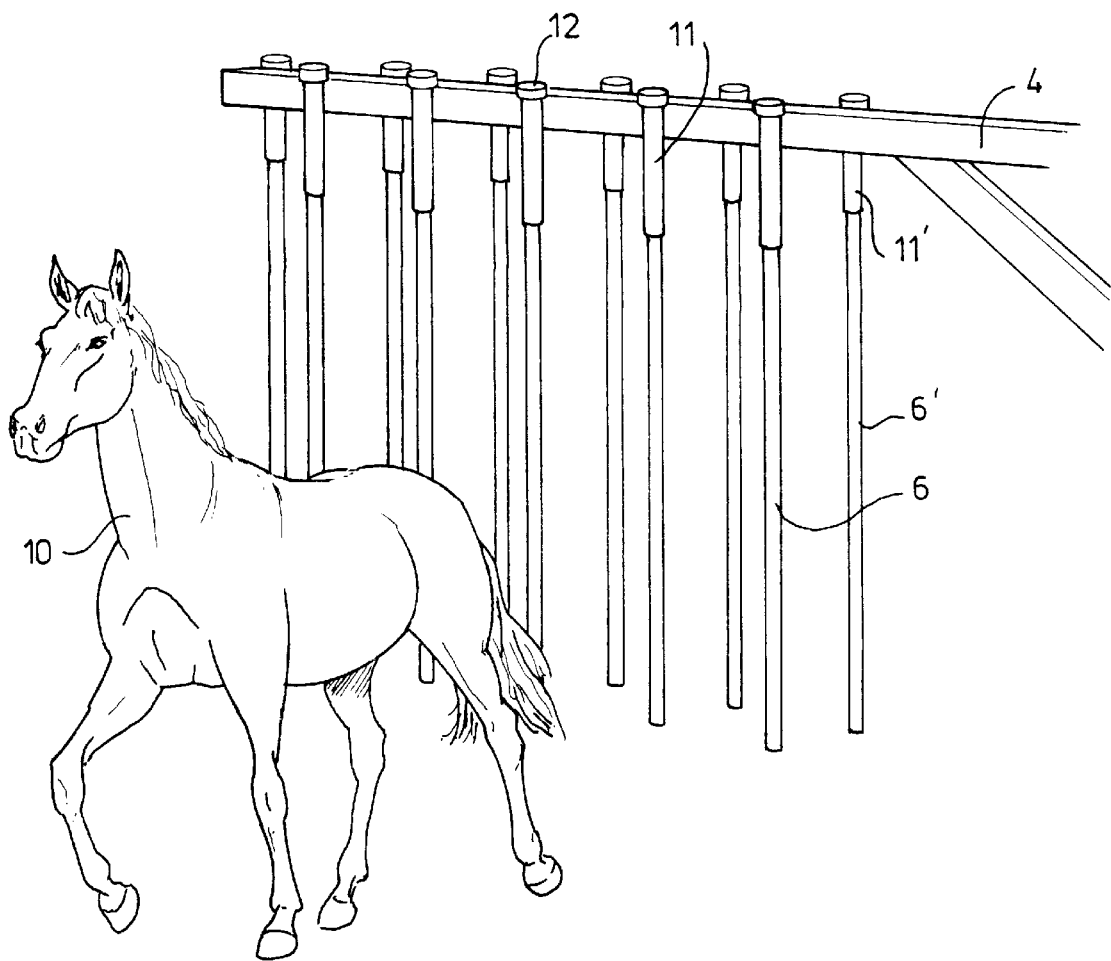

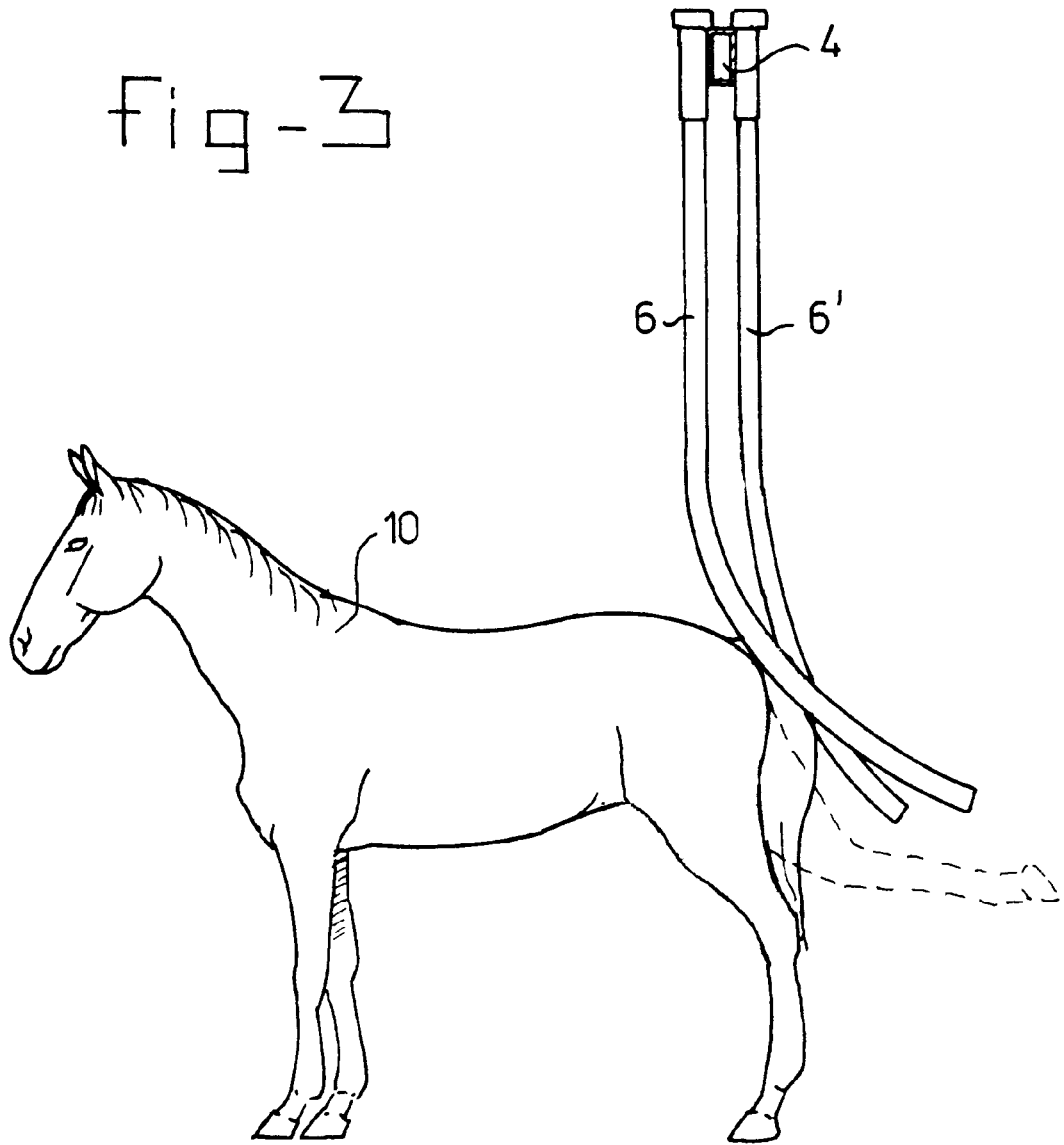

TRAINING INSTALLATION FOR HORSES

BACKGROUND OF THE INVENTION

The invention relates to an installation for moving horses, which are not on a rein, around an enclosed course inside two barriers, comprising an arm which can be moved around and above the course, from which arm a driving element is suspended, the driving element being movable around the course between the barriers. To bring and keep horses in condition it is known to allow horses to walk and trot on their own around an enclosed course. The course is enclosed by means of a fence formed by two essentially concentrically located barriers, such as walls or palings. To encourage the horse to move, an arm carrying a driving element is moved forward above the course behind the horse. It is known to construct said driving element in the form of a metal net or mesh suspended from the arm or in the form of pipes or rods. To encourage the horses, a voltage is frequently applied to the driving element, such as, for example 6000 volt at a very low amperage.

The known installation has the disadvantage that if the driving element becomes defective, for example as a result of the horses kicking backwards, the entire metal net has to be replaced.

Backward kicks from horses (comparable with blows by a strong construction worker bringing down a sloping-faced sledge hammer with full force) cause said driving fences to deform, which is extremely hazardous for horses, certainly if those fences are not replaced immediately. The life of the known driving fences is also limited. Rigid, immovable driving fences can also constitute a hazard because these do not give or do not give to an adequate extent and can lead to injuries or bruising. The wind force (CW value) plays a major role with the known driving fences and is relatively high. Horses which strike the driving fences with full force cause the entire installation to move and generate a noise which can cause panic in the horses in the installation. When the fence recoils there is a risk that the horse itself or the horse walking behind it will be hit again by the fence swaying to and fro after a kick.

SUMMARY OF THE INVENTION

One aim of the present invention is to provide an installation having a driving element which is able to withstand horses kicking backwards against it and which can easily be repaired if it becomes damaged. A further aim of the present invention is to provide a training installation which is very safe in use and which can be operated economically.

To this end a training installation according to the present invention is characterised in that the driving element comprises a number of flexible rod elements, a first end of which is fixed to the arm and a second end of which hangs free from the arm.

As a result of the freely suspended flexible rod elements, the horses are efficiently driven around the course. If the horses kick backwards against them, the flexible rod elements have a high degree of freedom of movement and are able to bend out of the way in order then to spring back into their former position without being damaged. Furthermore, in the unlikely event of a flexible rod element being damaged, said element can be simply replaced by another element, without the other rod elements having to be detached from the rotary arm. The flexible elements are lightweight and do not constitute a hazard to the horses. Moreover, the flexible rod-shaped elements make no noise when they are kicked. Furthermore, when a horse kicks the flexible elements the remainder of the installation does not move or barely moves, with the result that the rotary movement of the arm is not disturbed. Furthermore, it is not possible for the horses to become caught on the rod-shaped elements by their legs or shoes. The lightweight rod-shaped elements can not knock or puncture the skin and because of the low weight and the relatively low CW value of the elements less power is required to rotate the driving means and the drive motor has a longer life.

In this context "rod element" is used to define an elongated element which can be of either solid or hollow construction.

Preferably, each rod element has conducting means. By applying a current to the rod elements gentle contact with the rear of the horse is already sufficient to encourage the horse to trot. Preferably, the rod elements are made of plastic, the conducting means being applied to the outer surface of the rod elements. Conducting means can be formed by a metal wire, although it has been found that winding metal wire round plastic tubes leads to stresses and warping of the tubes. Preferably, the conducting means comprise a metal foil which is wound around the rod elements. By winding metal foil around the rod elements stresses on said elements can be prevented and a conductive surface is provided in a simple and efficient manner. The metal foil can be wound in strips around the length of the rod elements, it being preferable to wind the metal foil so that the windings around the rod element abut. This prevents a metal foil strip from being severed and the conducting capability being adversely affected. When the winding is around the entire outer surface of the rod elements there can be scratches or breaks in the metal foil without this adversely affecting the conducting capability along the rod element.

A suitable metal foil is, for example, self-adhesive aluminium tape.

The rod elements preferably comprise a plastic tube of the type used in high pressure technology. A suitable tube is the Vink air tube which is obtainable from Vink Kunststoffen, Didam, The Netherlands. Tubes of this type comprise a mixture of PE-PVC and have a wall diameter of, for example, 3 to 4 millimeters. Tubes of this type are very flexible and after bending return to a position in which they are hanging straight down. The rod elements are preferably mounted in vertical bushings so that they are able freely to shift therein. In the unlikely event of the arm of the training installation moving over a horse, for example because the horse falls, the rod elements will be pushed up in the bushings, without injuring the horse. Stop elements, which engage on the top edge of the bushings, are fitted on the tops of the rod elements. Furthermore, the bushing prevent the rod elements from being moved out of their vertical position on rotation of the arm around the course, as a consequence of the centrifugal force.

It is also possible to suspend the rod elements in holes which are made through a section of the arm, or from rings positioned along the outside of the arm, instead of in a bushing.

BRIEF DESCRIPTION OF THE DRAWINGS

An illustrative embodiment of a training installation according to the present invention will be explained in more detail with reference to the appended drawing.

In the drawing:

FIG. 2 shows a perspective view of a detail of the driving element according to the present invention, FIG. 3 shows, diagrammatically, the flexible characteristics of the rod elements according to the present invention.

DETAILED DESCRIPTION OF THE PREFERRED EMBODIMENTS

Figure 1:
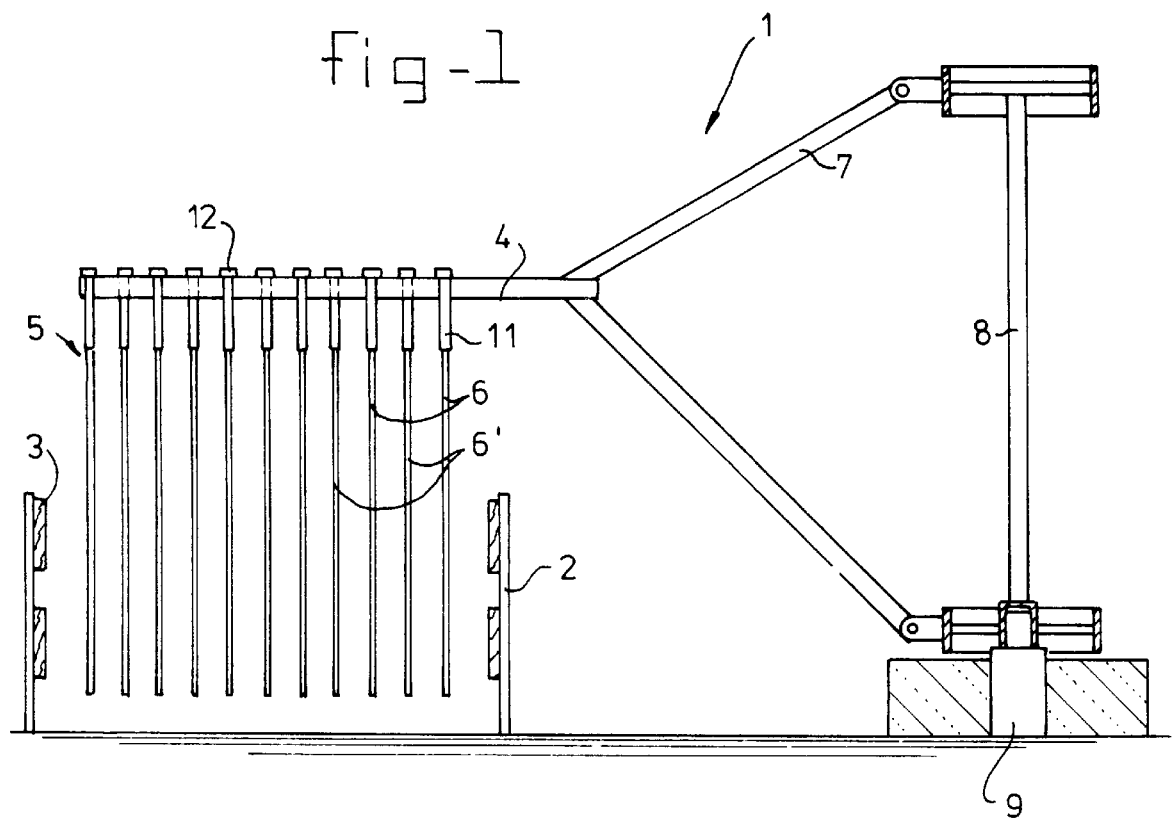
FIG. 1 shows a diagrammatic view of the training installation according to the invention.

As shown in FIG. 1, the training installation comprises an arm 4 which is rotatable above two fences 2, 3, which delimit an enclosed course. The speed of the arm can be adjusted as desired and can be up to around 35 km/h and in general is about 25 km/h. The spacing between the fences is, for example, 2 meters for a height of 2 meters. The diameter of the course is usually 15–25 m and can be up to 40 m. A driving element 5, which is suspended from the rotary arm 4, is located between the fences. The arm 4 is rotated around a vertical support 8 by means of a frame 7 which is fixed to said support. The drive for this can be, for example, by means of an electric motor 9, which has a variable speed. A number of flexible rod elements 6, 6' are suspended from the arm 4 and extend between the fences 2, 3. On rotating the arm 4 around the support 8, the flexible elements 6, 6' move around the course between the fences 2, 3, so that a horse is driven forward between them.

As can be seen from FIG. 2, the flexible elements 6, 6', which, for example, can have a diameter of 2 centimeters, are mounted in bushings 11. With this arrangement the flexible elements 6, 6' can slide freely back and forth within the bushings 11, so that if the arm 4 should move over the horse 10 the elements 6, 6' are pushed up in the bushings 11, 11'. The elements are prevented from falling down through the bushings, however, by caps 12 described below.

The flexible elements 6, 6' can be made of any flexible material, which means that the elements 6, 6' bend when subjected to a relatively low force and return to their original position after the external bending force is removed. This is illustrated in FIG. 3, in which the flexible elements 6, 6' bend out when subjected to a backward kick from the horse 10. In contrast to, for example, metal elements, which are permanently deformed when kicked by the horse 10, or wooden elements, which could break off, the flexible elements 6, 6' return to their original straight position. A suitable material for the elements 6, 6' is a plastic high pressure line made of a mixture of PE and PVC.

Figure 4:
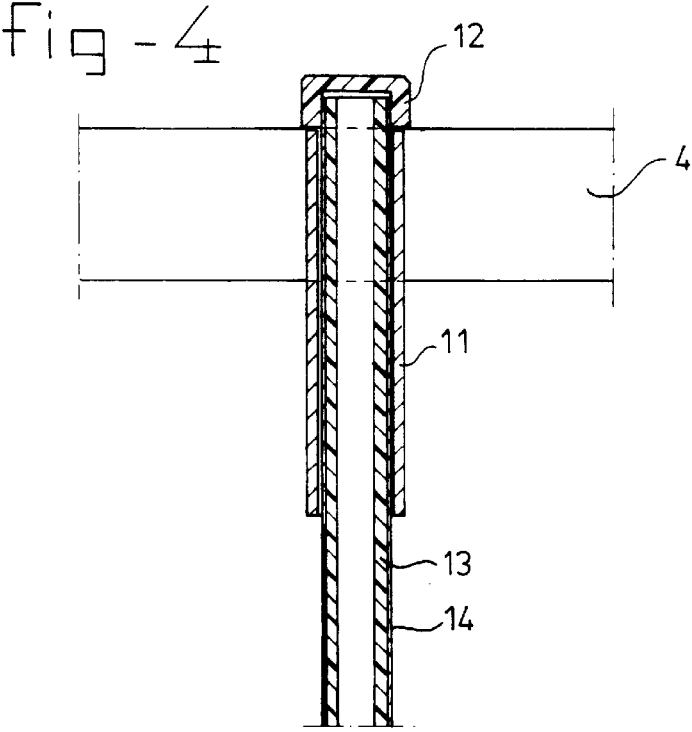
FIG. 4 shows, on an enlarged scale, a partial cross-section of a flexible tube suspended in a supporting bushing, in which the conducting metal foil is clearly visible.

Preferably, the flexible elements 6, 6' are wound round with a metal foil, such as, for example, self-adhesive aluminium tape. This is indicated in FIG. 4. The aluminium tape 14 is wound on the tube wall 13 in such a way that the outer surface of the tube 13 is virtually completely covered. As a result the outer surface of the tube 13 is provided with a conducting layer, which does not loose its conducting capacity even if it has local damage. A cap 12 is placed on the top of the tube 13, which cap seals the tube at the top and also forms a stop against the bushing 11, so that the end of the tube 13 is not able to slide downwardly and out through the bushing 11.

Preferably, the support 8 is positioned on the substrate such that it is electrically insulated. The electric motor 9 has an electrically insulated connection to the support 8 and drives the frame 7 by means of insulating V-belts, so that a voltage can be applied to the frame 7, the arm 4 and the support 8.

The connection of the frame 7 to the support 8 can alternatively be produced using electrically insulating material, so that a high voltage source with a very low amperage can be connected to the frame 7. As a result, for example 6000 volt is applied to the metal foil 14 of the flexible elements 6, 6' by electrically conducting contact of the arm 4 with the bushings 11, 11'. As a result the horses are encouraged to walk or trot around the course between the fences 2, 3.

I claim:

1. Installation for moving horses, which are not on a rein, around an enclosed course inside two barriers, comprising an arm which can be moved around and above the course, from which arm a driving element is suspended, the driving element being movable along the course between the barriers, characterized in that the driving element comprises a number of flexible rod elements, a first end of which is in contact with the arm and a second end of which hangs free from the arm, wherein each rod element is mounted with the first end freely slidable in a bushing fixed to the arm.

2. Training installation according to claim 1, characterised in that each rod element has conducting means.

3. Training installation according to claim 2, characterised in that the rod elements are made of plastic, the conducting means being applied to the outer surface of the rod elements.

4. Training installation according to claim 3, characterised in that the conducting means comprise a metal foil which is wound around the rod elements.

5. Training installation according to claim 4, characterised in that the metal foil is glued to the rod element.

6. Training installation according to claim 4, characterized in that the metal foil at least virtually entirely covers the outer surface of the rod element.

7. Training installation according to claim 1, characterized in that the rod elements comprise a plastic tube.

8. Training installation according to claim 1, characterized in that each rod element is provided at the first end with a stop element which extends in the radial direction beyond the outer periphery of the rod element to engage on the top edge of the bush.

9. Flexible rod element for use in an installation according to claim 1, provided with conducting means.

10. Flexible rod element according to claim 9, characterised in that the conducting means comprise a metal foil which is wound around the rod element.

11. Flexible rod element according to claim 9, characterized in that the rod element comprises a plastic tube.

* * * * *